July 9, 1929.　　J. REECE ET AL　　1,720,238
POWER TRANSMISSION
Filed Sept. 2, 1927　　6 Sheets-Sheet 4

Inventors.
John Reece
Franklin A. Reece
by Rogers, Kennedy & Campbell
Attys.

July 9, 1929.   J. REECE ET AL   1,720,238
POWER TRANSMISSION
Filed Sept. 2, 1927   6 Sheets-Sheet 6

Inventors.
John Reece
Franklin A. Reece
by Rogers, Kennedy & Campbell
Attys.

Patented July 9, 1929.

1,720,238

UNITED STATES PATENT OFFICE.

JOHN REECE, OF BOSTON, AND FRANKLIN A. REECE, OF BROOKLINE, MASSACHUSETTS, ASSIGNORS TO REECE TRANSMISSION COMPANY, OF BOSTON, MASSACHUSETTS, A CORPORATION OF MAINE.

POWER TRANSMISSION.

Application filed September 2, 1927. Serial No. 217,256.

This invention relates to power transmission and involves a novel apparatus for the mechanical transmission of power, for example from a suitable source of power or driving shaft to a driven shaft or other load, in a variable manner.

The invention is herein shown illustratively applied to the class of power transmission disclosed in our prior Patent No. 1,551,692 of September 1, 1925, and involving the underlying principles disclosed in Patent No. 1,546,404 of July 21, 1925; although it is to be understood that the present invention and certain features thereof are available with other classes of transmission. A typical purpose for which the invention is useful is as a part of the transmission of a motor vehicle or analogous use where the load is variable and it is desirble that the speed ratio and torque ratio should vary to correspond. The present disclosure therefore may be assumed to be herein illustratively applied to the motor vehicle type of transmission, especially for motor vehicles driven by internal combustion engines through a fly wheel and with the engine speed or power controlled by throttle. The general conditions and requirements of such transmissions have been set forth in the specifications of said prior patents to which reference may be had.

The general object of the present invention is to afford a power transmission apparatus adapted to meet the requirements referred to with efficiency of transmission, smoothness of operation, convenience of control and compactness and strength of structure. A particular object hereof is to afford a power transmission apparatus wherein, in addition to the normal or full speed forward drive adjustment, is a slow speed forward drive adjustment, giving high power for emergencies, and a slow speed reverse drive adjustment, either of which may be put into effect with ease and convenience of control and to afford smoothness and effectiveness of action.

A further object of the invention is to provide an efficient and convenient manual or pedal control, of selective action, which may be readily thrown in such a manner as to shift from the normal forward drive either to the slow drive or to the reverse drive. Other and further objects and advantages of the present invention will be explained in the hereinafter following description of an illustrative embodiment thereof or will be understood to those conversant with the subject matter of mechanical power transmission. To the attainment of the aforesaid objects and advantages the present invention consists in the novel power transmission apparatus, and the novel features of combination, operation, arrrangement, structure, design and detail herein illustrated or described.

In the accompanying drawings Fig. 1 is a central longitudinal section of a power transmission apparatus embodying the present invention, taken however on different planes in its upper and lower halves, as indicated by the broken line 1—1 of Fig. 2, the parts which are in full being viewed from the left side of the vehicle.

Figure 6:
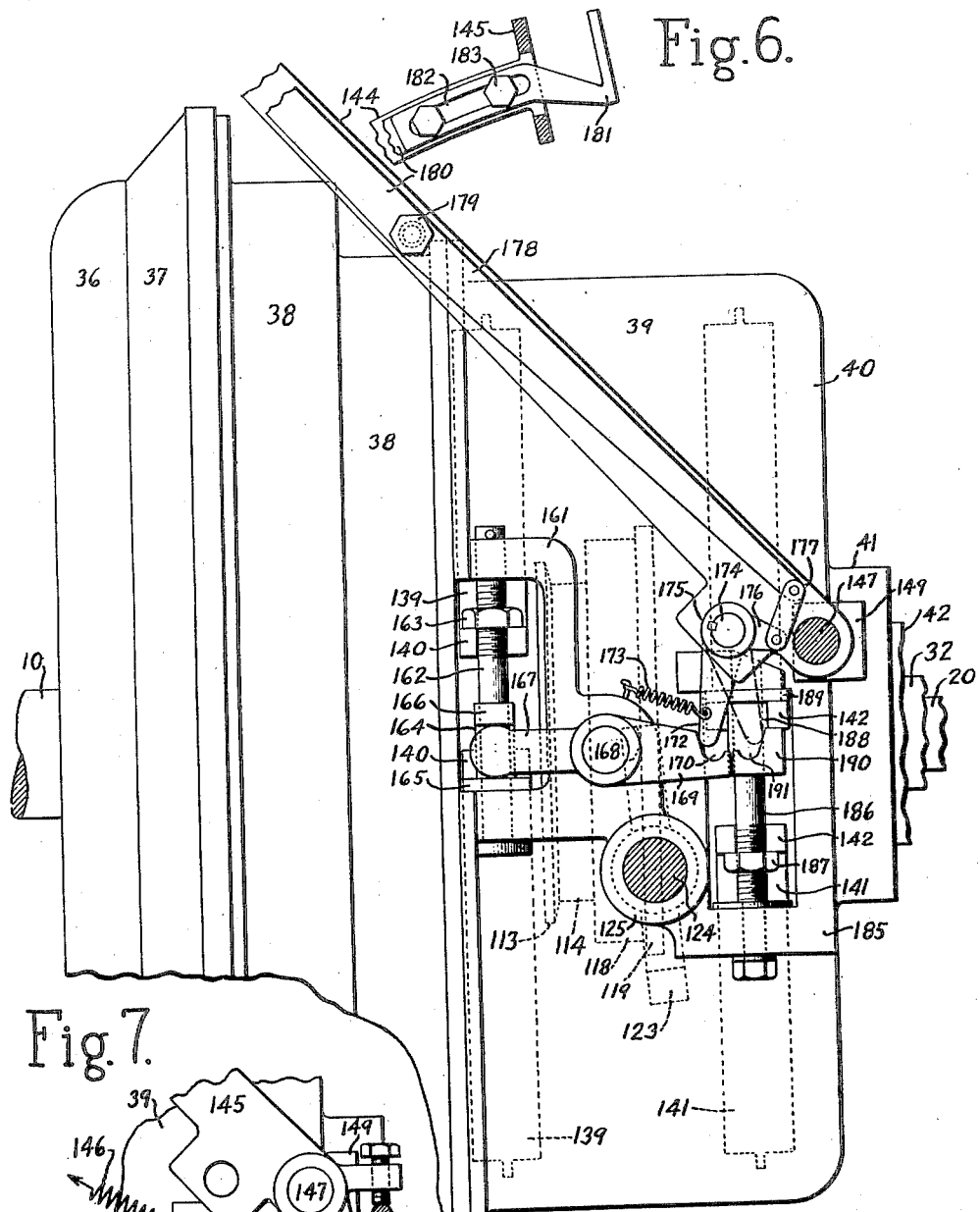
Fig. 6 is an exterior left elevation taken partly in vertical section on the line 6—6 of Fig. 5.
Figure 7:
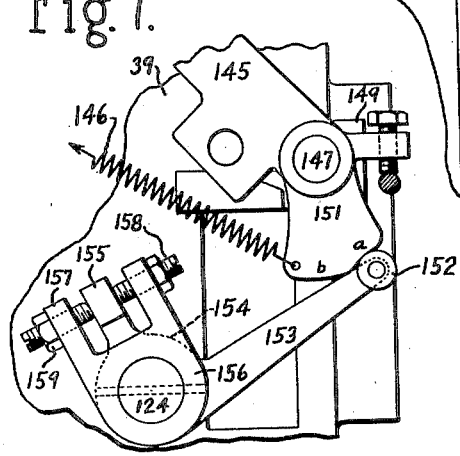

Fig. 7 in the same view as Fig. 6, shows the parts exterior to section line 6—6.

It will be convenient first to describe the driving or power parts of the apparatus, then the driven parts, then certain stationary casing parts, then the transmitting mechanism between the driving and driven parts and finally the control or pedal mechanism for effecting the desired alterations of drive.

Figure 1:
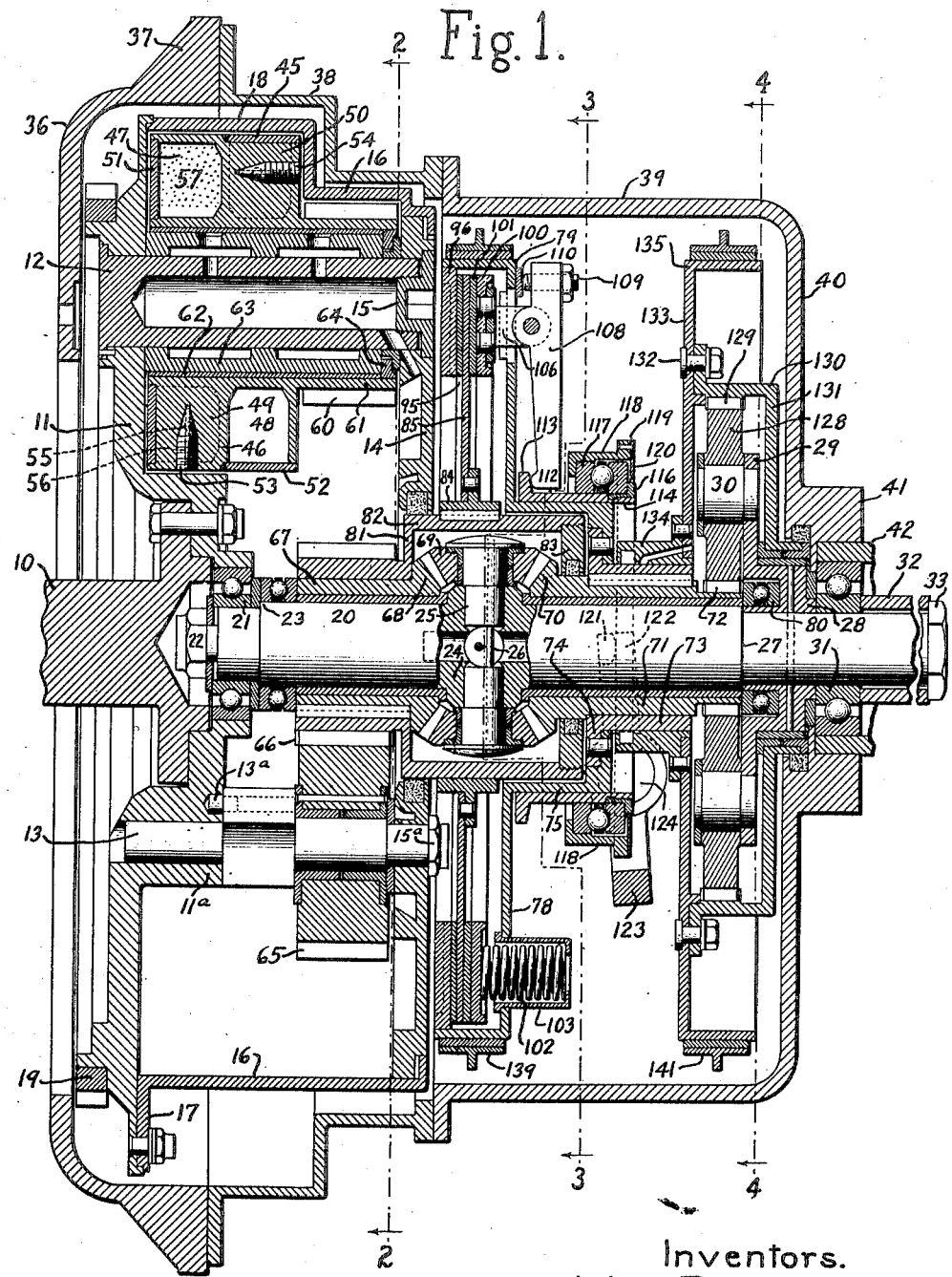
Figure 2:
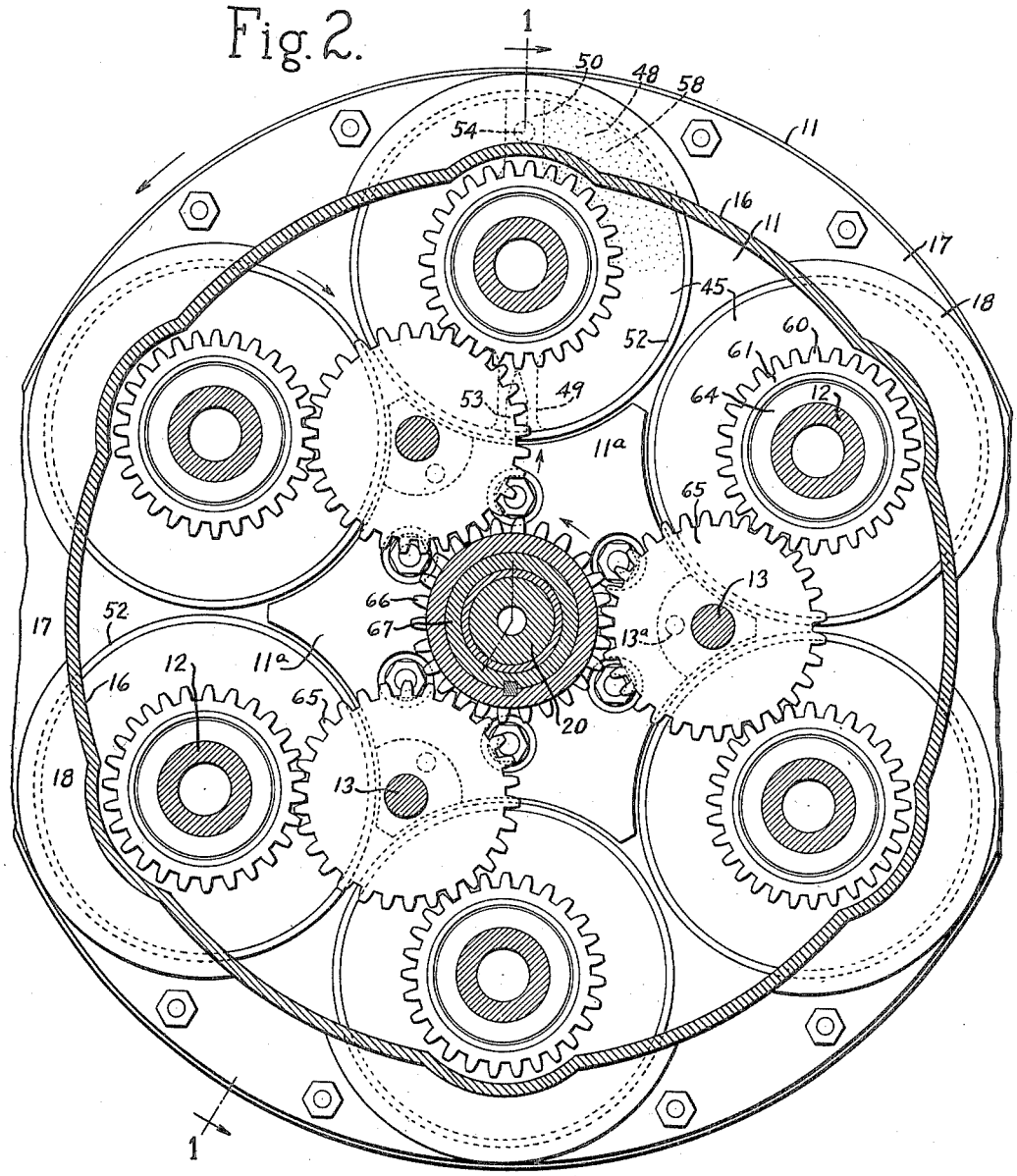
Fig. 2 is a transverse section taken on the line 2—2 of Fig. 1 and looking from the rear, that is from the right side of Fig. 1, with the outer fixed casing omitted.
Figure 3:
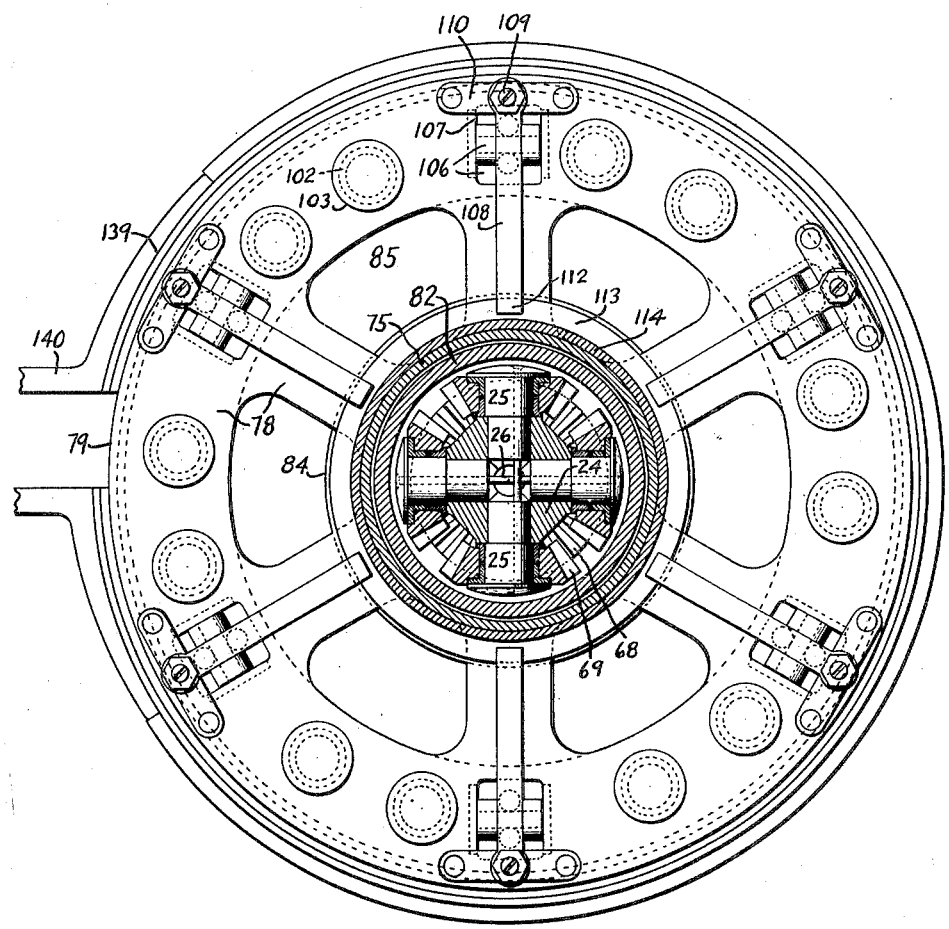
Fig. 3 is a similar transverse section taken on the line 3—3 of Fig. 1, with the driving parts and casing omitted.
Figure 4:
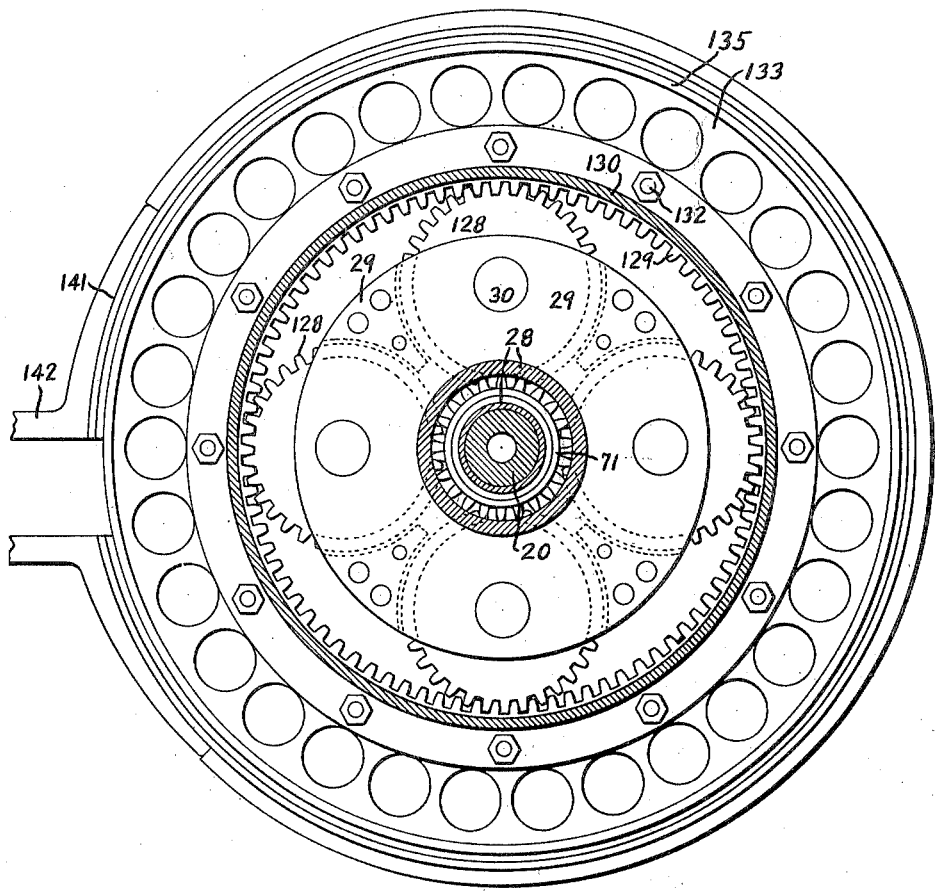
Fig. 4 is a similar transverse section taken on the line 4—4 of Fig. 1, with the driving parts and casing omitted, also the ball bearing appearing in the section plane.

Referring first to the driving parts, these comprise the shaft 10, representing the source of power such as the internal combustion engine of a vehicle, this shaft carrying a large revolving support or disk 11 on which are mounted various elements as will be described, which, taken together, possesses considerable mass and may be considered as a skeleton fly wheel, giving the fly wheel effect which is substantially essential for motors of the internal combustion class. The revolving disk or support 11 is shown as supporting a number of main studs 12, arranged parallel with the general axis of revolution or engine shaft, and giving bearing to the carriers or planetating rotors or planetors, as they may be called, to be described, the disk 11 having a hub 11ª bolted to the engine shaft flange and cut away in star shape to accommodate the carriers, as seen in Fig. 2. Six of such studs are shown, to accommodate six such carriers, preferably arranged as three opposite and balancing pairs. The fly wheel disk 11 is shown as supporting also a system of studs 13, three of them being shown, each arranged to carry an intermediate or idler pinion for effecting planetation of two of the planetors. Each of the idler studs 13 has an enlarged middle portion, cut away as indicated in Figs. 1 and 2 to accommodate the carriers, and each pinned by a pin 13ª to prevent rotation. The six main studs and the three idler studs are all shown as connected at their rear ends with a circular wall or disk 14, the assembly being secured into a rigid and unitary whole, for example, by interior nuts 15 tightened into the rear interior threaded ends of the hollow main studs 12, while nuts 15ª secure the studs 13 to the disk 14.

The enclosing disk 14 forms with the revolving support 11 a closed fly wheel chamber adapted to carry oil for lubrication of the carriers and gears, which is a distinct advantage over revolving these parts in an external body of oil contained in a fixed outer casing. The chamber is peripherally closed by a wall 16 extending between the disks 11 and 14, this wall being generally cylindrical, but, with a flange 17 bolted to the disk 11, and with rounded enlargements 18 accommodating the rotor carriers, and smaller enlargements for their attached planet studs. The inner edge of the disk 14 has an oil packing bearing on the revolving parts within.

The driven parts comprise the driven shaft 20 and parts turning with it. This shaft is shown hollow for oil circulation purposes. Its front end, at the left of Fig. 1, is provided with a ball bearing 21, between it and the revolving support 11, confined by a nut 22 in front and a shoulder 23 formed on the shaft to the rear. At a convenient point in its length, preferably to the rear of the assembled driving parts, the driven shaft is formed into an enlargement 24, bored at right angles in two or more radial directions to receive pinion studs 25, four being shown, each opposite pair of studs being tied or secured together by an elongated tie rod or rivet 26. Further to the rear the driving shaft is formed with a rear shoulder 27, and to the rear of this is keyed to the shaft a collar 28 having an offset flange 29 supporting planet studs 30 for purposes to be described later, and against the collar is confined a ball bearing 31 by a member 32 which may be a portion of the usual universal connection to the propeller shaft of the vehicle, this member 32 also being keyed to the driven shaft and confined thereon by an end nut 33 threaded upon the shaft. It will be understood that the connection 32 may drive through the propeller shaft to the usual rear axle gearing, by which the vehicle wheels are driven differentially and at such a reduced speed that a mean working speed of the engine affords a mean vehicle speed.

The fixed casing elements comprise a circular front wall 36 which may be attached to the vehicle frame, and may be of open construction since it is not herein required to carry oil. The front wall 36 at its outer edge is curved rearwardly and formed into an enlargement 37 to which is attached a stepped wall 38, the walls 36—38 surrounding the driving elements 10 to 19 of the transmission, and being preferably just large enough to clear the interior rotating parts. Extending rearwardly from the stepped wall is shown a cylindrical enclosing wall 39 which gives support to certain parts of the control mechanisms to be described, this cylindrical wall terminating in an end wall 40 having a squared enlargement 41 at its inner part, this provided with an oil packing in contact with the interior rotary parts. Attached to the casing enlargement 41 is shown an extension casing 42 surrounding the universal joint 32, and this in turn may connect with extension casings for the propeller shaft etc. Other fixed frame parts and walls will be referred to hereinafter.

Referring next to the transmitting means between the driving and driven members or shafts, the present disclosure shows six substantially identical mass carriers, rotors or planetors 45, spaced in balanced relation about the general axis and mounted respectively on the six studs 12 supported on the revoluble support 11. Each rotor is shown as a hollow structure, and is formed with a transverse partition 46 dividing the space into a front channel 47 and a rear channel 48, these channels being annular as in said Patent 1,546,404. Each of the channels constitutes a guide for one centrifugal mass or portion thereof, and is representative of any suitable guide, and as in said patent there may be more than two of such guides or channels on each rotor. Each guiding channel of each rotor is shown provided with, or closed at one point by, what may be termed a mass receiving pocket or abutment, or thrusting means, namely the abutments or thrusters 49 in the front channel and 50 in the rear channel, adapted to hold and carry or force the respective masses inwardly or against their existing centrifugal force. The respective mass holding or thrusting elements 49 and 50 in each carrier are spaced at different angular positions, shown as 180 degrees apart so as to give two successive thrusts and a balanced action to minimize vibration.

Each carrier is provided with a front closing plate 51 of annular form covering and closing the channel 47, this plate being preferably welded to the body of the carrier to give an air tight seal. The rear channel 48 of each carrier is preferably closed by a surrounding ring 52 also welded in place. This structure affords a strong rigid carrier economically constructed and well able to stand the strain and wear of constant use. The cylindrical carrier portion surrounding the channel 47 is integral with the partition or web 46 while the rear circular wall of the carrier is integral with the hub 61, which arrangement permits the hub to be continued and formed with an integral gear, which could not be done if the rear end wall had to be engaged and assembled in the same manner as the front wall 51.

Each front channel or its thrusting means is shown supplied with a centrifugal mass 57 which is indicated in Fig. 1 and may be a flowing mass consisting of mercury or small spheres flowing in oil, or other form of mass having substantial weight and ability to flow. Each rear channel 48 is supplied with a similar and equal mass 58, as indicated in Fig. 2, the two masses tending to balance each other to a large extent, and as well balancing accurately with the corresponding masses in the diametrically opposite carrier, so that the transmitting devices as a whole are well balanced and smooth running. The respective masses may be charged into the channels before the sealing of the covers but are preferably charged subsequently through the filling openings in the respective abutments 49 and 50 and thereafter sealed by the insertion of the screw plugs 53 and 54. It will be noticed that these filling openings and screw plugs are of a special shape, with a tapered portion like a needle valve. Each filling opening is shown as having a lateral air hole 55 at its tapered portion, leading to the channel. Each plug has a longitudinal passage 56. This arrangement permits an air exhausting apparatus to be connected to the plug before finally tightened into place so that substantially all air can be extracted from the channel, the plug being screwed tightly into place before disconnecting, thus permanently sealing the channel against admission of air. The plug may originally have an exterior extension for air connection, which may be severed after the plug is tightened down. The masses thereby work in the presence of a substantial vacuum thus preventing frothing of the masses as well as oxidation.

Each carrier 45 is actuated from the driven elements of the mechanism, by a reaction force; and for this purpose a planet gear 60 is associated with each carrier. As herein shown the body of the carrier and the planet gear are constructed of a single piece of steel thus greatly simplifying and strengthening the structure. The hub 61 of the carrier and gear is shown as lined by a sleeve 62 which rotates upon a perforated hollow bushing 63 surrounding the hollow planet stud 12. At the rear end of the sleeve and bushing are shown a pair of positioning washers 64.

The actuation of the several carriers or rotors may be effected from the driven shaft through connections as follow. The six planet gears 60 are shown engaging with three idler pinions 65 all of which engage with a central gear 66, which may be considered as rigid upon the driven shaft 20 during normal forward drive. The effect of the intermediate pinions 65 is to cause a planetary rotation of the carriers in a direction opposite to their revolution about the main axis. This is seen in Fig. 2, the revolving support 11 and connected fly wheel parts turning counterclockwise while the several rotors turn clockwise, the proportions preferably such that when the central gear is held stationary each carrier makes one rotation for each revolution.

The normal forward driving action will be understood by supposing the driven parts and central gear 66 to be held stationary so that while the support 11 revolves each of the carriers will rotate in clockwise direction. The centrifugal mass in each of the channels of each of the carriers passes through two phases being first forced inwardly against its centrifugal force during the transmitting phase and returning outwardly freely in the second or idle phase to be subsequently overtaken by the abutment and thrust again inwardly for repetition. The action has been sufficiently described in said prior Patent 1,551,692. The action is not only well balanced by the arrangement of the rotors and the abutments but it affords a substantially continuous transmission by reason of the overlapping series of thrusts. There will be six successive pairs of thrusts in each cycle. In practice the central gear will not be held stationary and therefore the carriers will planetate at a speed dependent upon the difference in rotary speeds of the driving and driven parts. The driving force or torque is variable and self-adjustable to the load encountered. When the load is so light that the power of the engine can drive at the full speed, as under ordinary road conditions, there will be no planetation of the rotors and the entire transmission will rotate as a unit without internal play. Where the load or drag is too great for uniform ratio drive, the driven shaft will slow down until planetary rotation of the carriers is produced at a speed which, opposed by the centrifugal force of the masses, will result in the requisite increased torque to overcome the load.

The normal or full forward drive is put into effect by interlocking or coupling the central gear 66 with the driven shaft as will be explained. In addition to the normal drive it is desirable to provide for a forward drive of high power and torque and correspondingly low speed which can be used in an emergency, and as well a reverse drive of substantial power; and the mechanisms to be described afford these emergency slow and reverse drives in a very efficient and convenient manner.

The central gear 66 instead of being keyed or permanent with the driven shaft 20 is connected only through special mechanism so as to permit the drive to be selectively adjusted either to the normal, the slow or the reverse. Thus the hub of the central gear is shown keyed to a sleeve 67 loosely surrounding the front end of the driven shaft. This front sleeve carries at its rear end a bevel gear 68, and this gear is shown engaged with a system of four bevel pinions 69 mounted on the studs 25 which stand out from the driven shaft, so that the pinions revolve bodily with the driven shaft. To the rear of these parts is shown a second or rear bevel gear 70 also engaging the pinions and being carried on a rear sleeve 71 also loose on the driven shaft. The sleeve 71 has at its rear end a gear 72 taking part in the reverse drive as will be described.

For the normal and slow forward drives the following is the plan of this invention. By coupling or clutching together the sleeves 67 and 71 so as to prevent relative rotation of the bevel gears 68 and 70 it is manifest that the pinions can not rotate and therefore the sleeves are in effect a rigid part of the driven shaft, so that normal forward drive is effected as already described. If, however, the sleeves be uncoupled and the rear sleeve be anchored or brought to a substantially stationary condition then the forward rotation of the central gear and front sleeve acting through the bevel pinions will manifestly deliver a forward drive to the driven shaft of half the normal speed and double the driving torque.

For these purposes the rear sleeve 71 is shown as having keyed to it a surrounding hub 73, to the flange 74 of which is bolted a cylindrical extension 75 extending forwardly to a convenient point where it is turned outwardly in the form of an open web or spokes 78 and with a braking extension 79 at the periphery thereof preferably in the form of a drum adapted to receive a brake strap for bringing the drum to rest to impose the slow drive. The rear end of the rear sleeve 71 is shown as having a thrust bearing 80 interposed between it and the driven collar 28 to facilitate the relative rotation of the sleeve and connected parts including drum 79.

The additional connections employed for coupling together the two sleeves and bevel gears to impose normal drive may commence with a flange or web 81 outstanding from the central gear hub or front sleeve. This flange is shown as continued in the form of a cylindrical extension 82 which surrounds the bevel gears and pinions and is provided at its rear end with a closing ring 83 with an oil packing running on the sleeve 71 so as to afford an oil chamber in which the bevel gears and pinions operate. Upon the periphery of the cylindrical extension 82 is keyed a hub 84 to which is bolted an outward flange or web 85 adapted to be clutched to the brake drum 79 or its web as will next be described.

The coupling parts for imposing the normal drive may be collectively referred to as a clutch 95 of which the middle member is the braking extension or web 85 which turns rigidly with the central gear 66. This web or friction flange is located within the drum 79. The drum at its forward edge has secured to it an inwardly extending wall 96, so that the friction flange 85 is located between the wall 96 and the web 78 of the drum. A pressure ring 100 is located between the friction flange and the web, and friction linings or rings 101 are interposed at each side of the friction flange. This clutching assembly is maintained under a normal spring pressure so that the normal drive is ordinarily in effect. This may conveniently be done by means of a series of coil springs 102 each of which is enclosed in a cylindrical barrel 103, there being shown twelve of these spaced around the drum web 78, and producing a substantial and uniform pressure against the pressure plate to apply friction to the friction flange.

To release the clutch 95 for change of drive the following mechanism is disclosed operating to retract rearwardly the pressure plate 100 and thus discontinue the frictional pressure on the flange 85. Attached to the pressure ring are a number of angle plates 106 extending through openings 107 in the web 78, and external of the openings are a number of levers 108 each fulcrumed on the exterior part of one of the angle plates. The outwardly extending portion of each lever is provided with a contact screw 109 for determining the adjustment and extent of retraction of the pressure ring, these screws bearing on a number of wear plates 110. The inner end of each lever 108 is enlarged into a head 112 which bears forwardly against a low flange 113 of a sleeve 114 splined to the cylindrical extension 75 which turns rigidly with the rear sleeve 71. The rear end of the sleeve 114 has screwed to it a flange 116 and against this flange is confined a thrust bearing 117, which is surrounded by a double flanged ring 118, the outer flange 119 of which is thrust upon for shifting described parts, while an enclosing disk 120 secures the parts snugly together. For releasing the clutch 95 the sleeve 114 may be thrust rearwardly through contact lugs 121 of yoke arms 122 bearing on the flange 119. The two opposite yoke or rock arms 122 are interconnected by a yoke arch 123 as best seen in dotted lines in Fig. 5, and the yoke is mounted on a rock shaft 124 which takes its bearings in the casing wall 39, the left end of the shaft projecting through a frame enlargement 125 to an exterior point from which the clutching and unclutching operations may be effected as will be subsequently explained.

Referring next to the connections for effecting reverse drive, these comprise planet gears 128 turning on the studs 30 which are mounted on the driven shaft collar 28, these planet gears engaging the gear 72 formed on the rear end of the rear sleeve 71 and engaging also with an internal gear 129 which is normally loose and free but adapted to be rendered stationary to impose the reverse drive. The rim 130 is formed with a web or disk 131 extending inwardly and having its foot or hub in rotary contact upon the parts to the interior thereof, thus steadying the motion and action of the internal gear. The rim 130 carrying the gear is also attached by bolts 132 to a web 133 extending inwardly and having its foot or hub 134 arranged to turn loosely on the hub 73. By this arrangement the planet gears 128 and the gears engaged by them are enclosed in an oil tight chamber formed between the webs 131 and 133 and the rim 130. The peripheral portion of the web 133 constitutes a braking extension by which the internal gear 129 may be rendered stationary to impose reverse drive, and for this purpose the web is preferably formed into a brake drum 135.

The reverse drive operates as follows. The normal drive being released and the drum 135 braked and held, the internal gear 129 remains stationary so that the planet wheels 128, mounted on the driven shaft collar 28, can planetate according to the rotation of the gear 72 on sleeve 71 and thus transmit torque to the driven shaft. The sleeve of course is in connection with the driven shaft also through its bevel gear 70 engaging the bevel pinions 69 carried by the shaft, while the front bevel gear 68, attached to the central gear 66 constitutes the source of power for this train. Assuming a forward torque value of 1 in the front sleeve and bevel gear, there will be a forward torque of 2 at the front end of the driven shaft, and a reverse torque of 1 in the rear bevel gear and sleeve, and in the gear 72 at the rear of the sleeve. This is multiplied by the planet gears and internal gear, and with the proportions shown delivers a reverse torque of 5 to the driven shaft. The net result or actual transmission is the difference between forward 2 and reverse 5, or reverse 3. Therefore the driven shaft will turn reversely at one third the normal speed and with three times the torque. Such a reverse is effective and new per se, and intended to be so covered.

There have thus been described two braking extensions or drums 79 and 135. The front drum is braked and brought to rest to impose slow drive and it is shown as engaged by a brake band 139 with its terminals extended outwardly to the left as lugs 140, while the rear drum 135 is shown engaged by a brake band 141 having its terminals formed with projecting lugs 142 for operation of the band.

We thus have three working elements for the control of the drive, first the rock shaft 124 which may be rocked to relieve the clutch 95 and thus release the normal forward drive, and the front brake band 139 which may be operated to anchor the forward drum 79 to impose slow drive and finally the rear brake band 141 for anchoring the rear drum 135 to impose reverse drive. Preferably these control operations are effected from a single controller, lever or pedal arranged, when depressed, first to rock the shaft 124 to relieve the normal drive and thereupon to tighten one or the other of the brake bands at will to impose the slow or reverse drive. These pedal control mechanisms will now be described.

Figure 5:
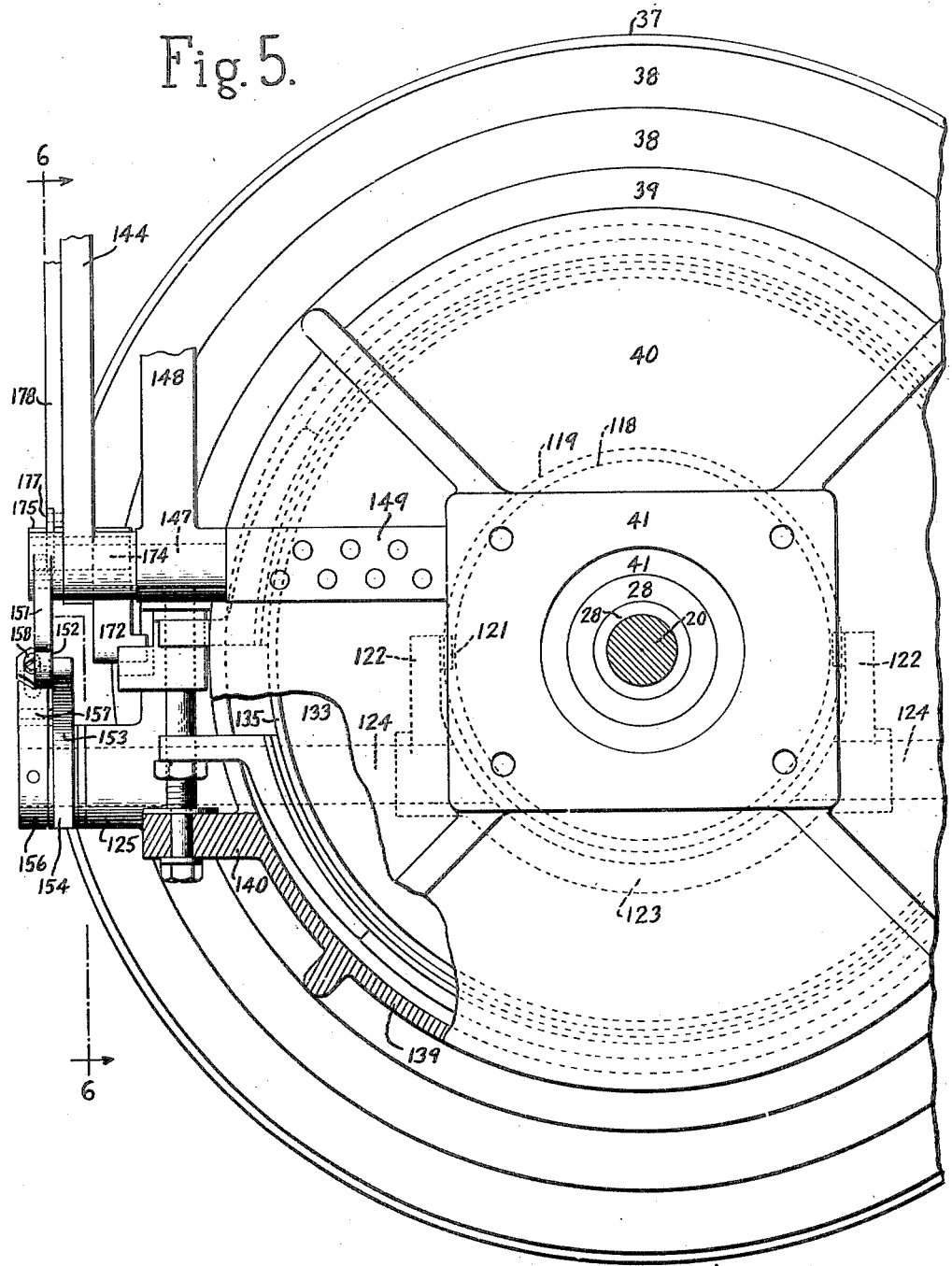
Fig. 5 is a rear elevation of the assembled apparatus including the main casing, but partly broken away to show interior parts, and with the rear ball bearing and surrounding casing omitted, and the driven shaft in cross section.

As seen in Figs. 5 and 6 there is a main pedal lever 144 carrying a foot piece 145. This pedal is normally held in its elevated position by the springs 102 which are normally operating to apply the clutch 92 to maintain normal drive, and there may be an additional pedal spring 146. The pedal lever is shown mounted on a fulcrum or axle 147 which rotates in a fixed bracket or frame part 148 steadied by a lug 149 on the casing wall 40. When the pedal is thrust downwardly it may release the clutch 95 by the following means. A cam 151 is shown attached to the pedal lever or its axle as seen in Figs. 5 and 7. This cam has an active surface $a$ and a dwell $b$, a follower or cam roll 152 being shown engaged at the beginning of the active portion. The cam roll is mounted on a cam arm 153, the hub 154 of which turns loosely on the rock shaft 124, but has an outstanding lug 155. Pinned to the outer end of the rock shaft is a hub 156 having outstanding lugs 157 spaced apart with the lug 155 between them. Each lug 157 is threaded to receive a contact screw 158, these screws being set to contact the lug 155 and held by lock nuts 159. When the pedal lever 145 is depressed the cam 151 first throws down the arm 153 and rocks the shaft 124, thus releasing the clutch 95. During the remainder of the movement of the pedal lever the follower travels along the dwell of the cam and is without operation, but during this second period the pedal depression will apply the slow or reverse drive. The action therefore requires no attention except to depress the pedal lever. If the lever be depressed half way and there held the normal drive will be released, but neither the slow nor the reverse drive will be imposed, and in this way the driven parts may be allowed to run free. The screws 158 may be shifted to adjust the movement of the rock shaft 124.

The means whereby the pedal lever, in the last part of its descending movement, effects, at will, the application of one or the other of the brake bands to impose slow or reverse drive will now be described. Referring first to the emergency slow drive, the lugs 140 of the front brake band 139 are shown accommodated in a box like projection 161 of the casing 39. A vertical rod or guide 162 is shown secured in fixed position in the box walls by an enlarged head below and a pin above. The upper part of the rod is threaded to receive a nut 163 beneath which is confined the upper band lug 140, the position of which is thus adjustable by the nut 163 for determining the action of the brake band on its drum. Sliding on the lower part of the rod 162 is a sleeve member 164 having a lower flange 165 beneath the lower brake lug 140 and having an upper lug 166 which may be pressed upwardly by a rock arm 167 to lift the lower band lug and thus tighten the band on the drum. The rock arm 167 is shown as fulcrumed at 168 on a fixed stud and having a rear extension 169 formed with a recess or pocket 170 adapted to receive a thrusting member for swinging the rock arm and thus applying the front brake band.

The pedal connections for effecting these operations are shown as including a pusher arm 172 mounted swingingly on the pedal lever 145 not far from the fulcrum of the latter. The pusher arm 172 has a certain loose play with the rock arm 169 and is held yieldingly in engagement with the side of the pocket 170 by a spring 173. The upper end of the pusher arm 172 is mounted on a short rock shaft 174 extending through the pedal lever and having at the outer side a collar 175 provided with a second rock arm 176. This rock arm is connected by a link 177 with the lower arm 178 of a supplemental pedal lever fulcrumed at 179 to the main pedal lever and having an upper arm 180 curved around in conformity with the main pedal lever and at its extremity provided with a supplemental foot piece 181, the movements of which are guided with respect to the main foot piece by a slot 182 in the supplemental foot piece engaging guide pins 183 on the main foot piece.

The effect of the described pedal connection is that if the main foot piece 145 be depressed the pusher arm 172 will slide down to the bottom of the pocket 170 and in its continued movement will swing the rock arm 169 and thus apply the front or slow speed brake band. During the first part of the pedal movement the normal drive clutch 95 is released and during the latter part of the movement the slow drive is engaged. If, however, the pedal be depressed by the supplemental foot piece 181 this will yield while swinging the supplemental pedal lever and will thereupon meet the main foot piece and depress the main pedal lever. The first part of this movement operates to swing the supplemental pedal lever which operates through link 177 and rock shaft 174 to shift the pusher arm 172 from the full line position of Fig. 6 to the dotted line position, so that the descent of the main pedal will be inoperative to engage the slow drive.

The reverse drive is engageable by the complete depression of the supplemental and main foot pieces as follows. The upper and lower lugs 142 of the rear brake band are accommodated in a box like frame structure 185. Extending through this box and through the band lugs is a guide rod 186, the lower threaded part of which carries a nut 187 confining the lower band lug 142. Sliding on the upper part of the rod is a sleeve 188 having a flange 189 overlying the upper band lug and this sleeve at its lower portion is formed with an enlargement or block 190 containing a recess or pocket 191. This pocket is located directly beneath the rear swung position of the pusher arm 172 as indicated in dotted lines on Fig. 6, with the result that when the supplemental foot piece 181 is depressed the pusher arm is swung over the pocket 191 in the same relation that it formerly had to the pocket 170, so that the depression of the main pedal, after releasing the normal drive clutch 95, will depress the sleeve 188, thus forcing down the upper band lug 142 and applying the rear brake band 141 to impose reverse drive.

The clutch 95 is easily released by a short throw of the pedal because the clutch springs may be light due to the fact that the braking extensions tend to turn oppositely and afford double gripping or clutching effect.

The described transmission mechanism is well adapted for effective lubrication. As has already been described the driving parts are enclosed in a revolving oil chamber; the bevel gears and pinions are enclosed in a revolving chamber; and the reversing gears are enclosed in a chamber which revolves except during reverse drive. The fixed outer casing contains no body of oil, and the disadvantages of splashing through oil are obviated. The main clutch 95 and both brake drums and bands are protected from oil. Various oil packings and passages have been referred to or are disclosed. The chamber enclosing the rotors may be given an initial supply of oil, and the gear movements combined with centrifugal force will keep all parts lubricated. A heavy oil may be fed to the other chambers through the hollow interior of the driven shaft by a grease cup, and the shaft may have radial exit openings at the points designated. The total volume of oil is minimized by the reduced contour of the chambers. Thus the cylindrical casing 16 with its enlargements 18 is shaped fairly closely to the planetary carriers and gears as seen in Figs. 1 and 2. The oil of course revolves with the casing and carriers so that the latter rotate smoothly in the lubricant without splashing.

The operation of the transmission and its mode of control have been fully indicated during the description of the structure. As long as the engine speed is high enough to create substantial centrifugal force in the masses the normal forward or direct drive will be in effect. When the pedal is depressed through its main foot piece or through the supplemental foot piece this will throw out the normal drive and apply the slow drive or the reverse, but when the pedal is depressed only part way the driven parts will be free. The clutch 95 by which the normal drive (of variable ratio) is thrown out when applying slow or reverse is not to be compared with the ordinary clutch used with gear shift transmissions, which has to be disengaged for any change of driving ratio and when running free or stopping the vehicle.

In the case of the slow and the reverse drives, as well as with the normal drive, the transmission is through the planetating carriers and centrifugal masses, which is advantageous as compared with an independent slow or reverse gearing which would involve idle and disadvantageous planetation of the masses. The described system of carriers and masses is double acting, that is, the centrifugal force will be operative in case the engine is employed to brake the vehicle, the carriers being caused to rotate on their axes in the reverse of the usual direction. The particular self acting transmission system between the engine shaft and the front sleeve 67 is merely illustrative as other mechanisms might be similarly employed. For that matter, instead of a self adjusting transmission, there might be a simple gearing, or even a rigid connection, between the engine shaft and the front sleeve. In other words the front sleeve might be rotated directly from the engine, (or through the ordinary clutch) and the shift mechanism hereof employed to impose at will the normal full speed or direct drive, or the slow speed forward drive, or the reverse drive, or disconnection, by the simple manipulation of the control lever or pedal as already described.

This application is a companion to application filed by us recently, and may be considered as an improvement upon and embodiment of the features there shown; and the other application may be referred to for features of detail and operation not fully herein described and for permissible modifications of operation, combinations and structure.

It will thus be seen that there has been described a power transmission apparatus embodying the principles and attaining the objects and advantages of the present invention. Since many matters of combination, operation, arrangement, structure, design and detail may be variously modified without departing from the principles, it is not intended to limit the invention to such matters except to the extent as set forth in the appended claims.

What is claimed is:

1. Power transmission apparatus comprising the rotary driving and driven members, a support revolved by the driving member, a system of co-acting centrifugal masses and mass thrusting means on the support, and connections between the driven member and thrusting means for applying the driven load resistance to the thrusting means, whereby the reaction of the centrifugal force of the masses is transmitted as torque to the driven member, said connections comprising a pinion shaft mounted at an angle upon the driven member, a pinion on said shaft, a first gear engaging said pinion and receiving the torque developed by the masses, a second gear engaging the pinion, means for preventing relative movement of said gears to impose normal drive on the driven member, means for holding the second gear against rotation to impose slow drive on the driven member, and reversing means between the second gear and driven member to impose reverse drive on the driven member.

2. Power transmission apparatus comprising the rotary driving and driven members, and an intermediate rotary member or sleeve, a support revolved by the driving member, a system of co-acting centrifugal masses and mass thrusting means on the support, and connections between the intermediate member and thrusting means for applying the driven load resistance to the thrusting means, whereby the reaction of the centrifugal force of the masses is transmitted as torque to the intermediate member, said connections comprising a first gear on the intermediate member, a pinion shaft mounted at an angle upon the driven member, a pinion on said shaft engaging said first gear, a second gear engaging the pinion, means for preventing relative movement of said gears to impose normal drive on the driven member, means for holding the second gear against rotation to impose slow drive on the driven member, and reversing means between the second gear and the driven member.

3. Power transmission apparatus comprising the rotary driving and driven members, a first gear rotated forwardly by the driving member, a second gear, a gear member mounted on a shaft outstanding from the driven member and engaging both said gears, a holding extension connected to the second gear and means for holding it to render the second gear stationary to impose slow forward drive, a reversing gearing between the second gear and driven member and means for rendering it effective to impose reverse drive, and coupling means for effectively compelling the driven member to rotate with the first gear to impose normal forward drive.

4. Power transmission apparatus comprising the rotary driving and driven members, a first gear turned forwardly by said driving member, a second gear, a gear member mounted on a shaft outstanding from the driven member and engaging both said gears, an extension connected to the second gear and means for braking it to render the second gear stationary to impose slow forward drive, an extension connected to the first gear and means for coupling it to the extension of the second gear to impose normal forward drive, and a reversing gearing between the second gear and driven member adapted, in cooperation with said gear member connecting the first gear to the second gear, to compel slow reverse rotation of the driven member.

5. Apparatus as in claim 3 and wherein the reversing gearing comprises a gear (72) turning with the second gear (70), a gear member (128) on an extension of the driven member, and a gear (129) engaged by the gear member, the same normally free, and means for holding it to impose reverse drive.

6. In or for power transmission apparatus of the class referred to, a planetary carrier for a flowing centrifugal mass comprising an air tight casing containing a chamber or chambers for the mass and formed with a filling opening having a tapered seat, and a sealing plug for closing the filling opening having a tapered end fitting said seat, and a longitudinal air passage, whereby air may be exhausted through said passage and the carrier sealed by tightening the plug to its seat.

7. Power transmission apparatus comprising the rotary driving and driven members, a first gear turned forwardly by said driving member, a second gear, a gear member mounted on a shaft outstanding from the driven member and engaging both said gears, an extension connected to the second gear and means for braking it to render the second gear stationary to impose slow forward drive, and a reversing gearing between the second gear and driven member adapted to compel slow reverse rotation of the driven member, and comprising a gear turning with the second gear, a gear member on an extension of the driven member, and a gear engaged by the gear member, the same normally free, and means for holding it to impose reverse drive.

8. In or for power transmission apparatus of the class referred to, a planetary carrier or rotor comprising a hollow casing of cylindrical form having a plurality of chambers containing centrifugal masses, the body of the carrier having a cylindrical wall enclosing one end chamber and an end wall enclosing the other end chamber, with an attached end disk closing the first of such end chambers, and a cylindrical ring closing the other of such end chambers.

In testimony whereof, we have affixed our signatures hereto.

JOHN REECE.
FRANKLIN A. REECE.